Patented Sept. 13, 1927.

1,642,263

UNITED STATES PATENT OFFICE.

ALOIS ZINKE, OF GRAZ, AUSTRIA, ASSIGNOR, BY MESNE ASSIGNMENTS, TO FELICE BENSA, OF GENOA, ITALY.

PROCESS FOR MANUFACTURING DINITRO PERYLENE QUINONE.

No Drawing. Application filed June 15, 1923, Serial No. 645,703, and in Austria June 20, 1922.

It is known that by nitrating perylene quinone mononitro perylene quinone is obtained. I have discovered that by increasing the duration of the reaction the nitration further proceeds and dinitro perylene quinone is formed. According to the invention mononitro perylene quinone already formed is nitrated once more, but preferably perylene quinone is used as the prime material and the nitration is caused to continue beyond the formation of mononitro perylene quinone up to the formation of dinitro perylene quinones.

*Example.*—One part by weight of 3.10 perylene quinone is heated to boiling with a mixture of 250 parts by weight of glacial acetic acid and 80 parts by weight of concentrated nitric acid (density 1.4). After boiling for a short period the separation of mononitro perylene quinone begins which on further boiling becomes darker in colour. After boiling for half an hour the reaction is finished.

The dinitro derivatives dissolve in concentrated sulphuric acid with violet colour. They are insoluble in alcohol, ether, acetone and kerosene and soluble in boiling nitrobenzol, and can be purified by crystallizing from nitrobenzol and are then obtained in reddish brown needles. The output is 90 to 95% of the theory.

The vat is brownish voilet, cotton is dyed violet. The dinitroperylene quinone can be directly used as a dye or it can be used as prime material for the manufacture of other dyes.

The following diagram shows the structural formula of the dinitro perylene quinone with the numbering of the positions.

The position of the two $NO_2$ groups could not be fully ascertained up to now

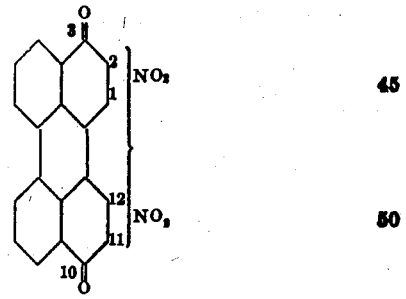

What I claim is:

1. A process for manufacturing dinitro perylene quinone consisting in heating to boiling mononitro perylene quinone with a mixture of glacial acetic acid and concentrated nitric acid of a density of 1.4.

2. A process for manufacturing dinitro perylene quinone consisting in heating to boiling perylene quinone with a mixture of glacial acetic acid and concentrated nitric acid of a density of 1.4 whereby first mononitro perylene quinone is formed and in then continuing boiling whereby dinitro perylene quinone is formed.

3. A process for manufacturing dinitro perylene quinone consisting in boiling perylene quinone with a mixture of glacial acetic acid and concentrated nitric acid of a density of 1.4 during a period of time not exceeding one hour.

4. As a new article of manufacture, dinitroperylene 3.10 quinone.

In testimony whereof I have signed my name to this specification.

ALOIS ZINKE.